Dec. 1, 1931.  W. C. THORNHILL  1,834,322
MARINE REVERSE GEAR
Filed Dec. 19, 1930  2 Sheets-Sheet 1
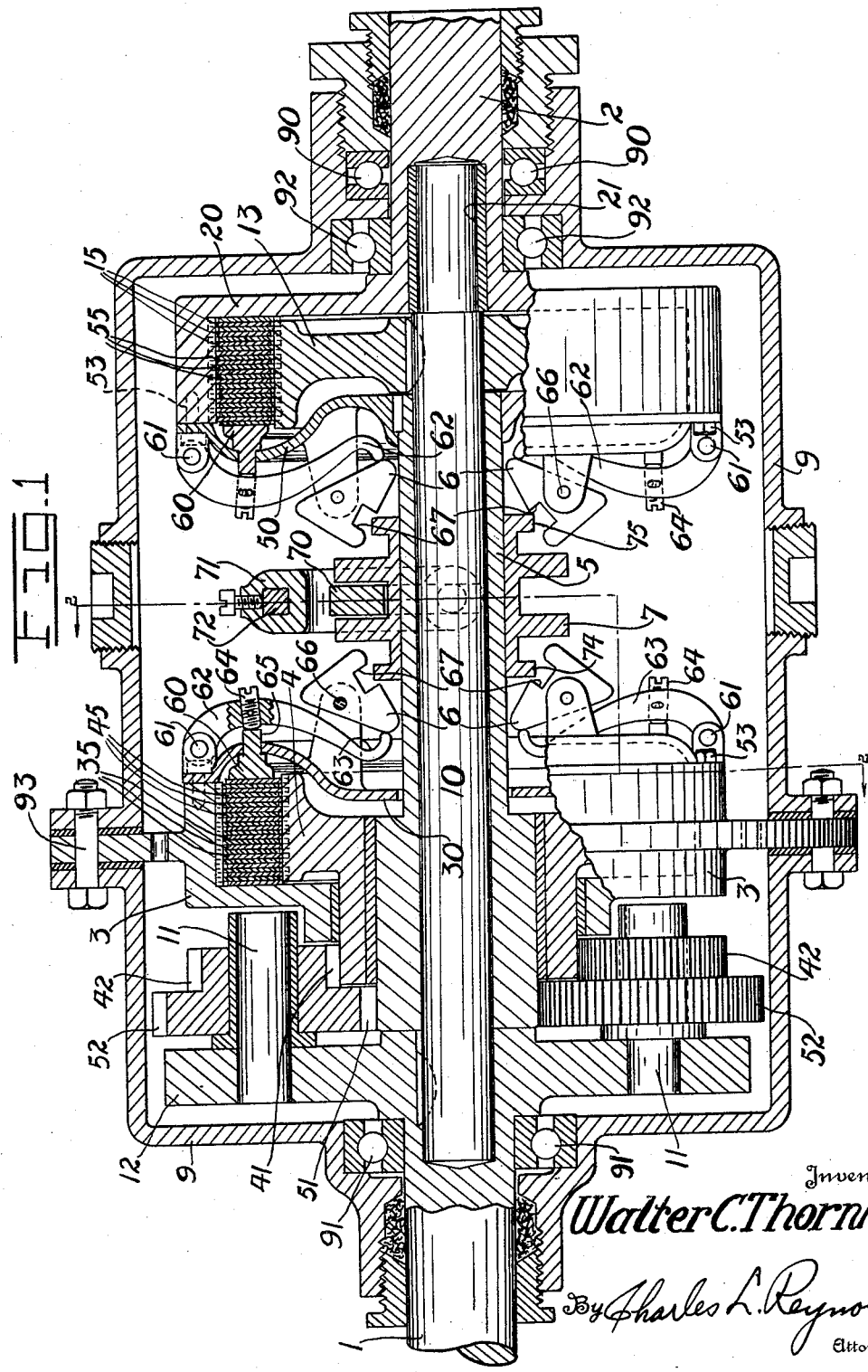
Inventor
Walter C. Thornhill
By Charles L. Reynolds
Attorney

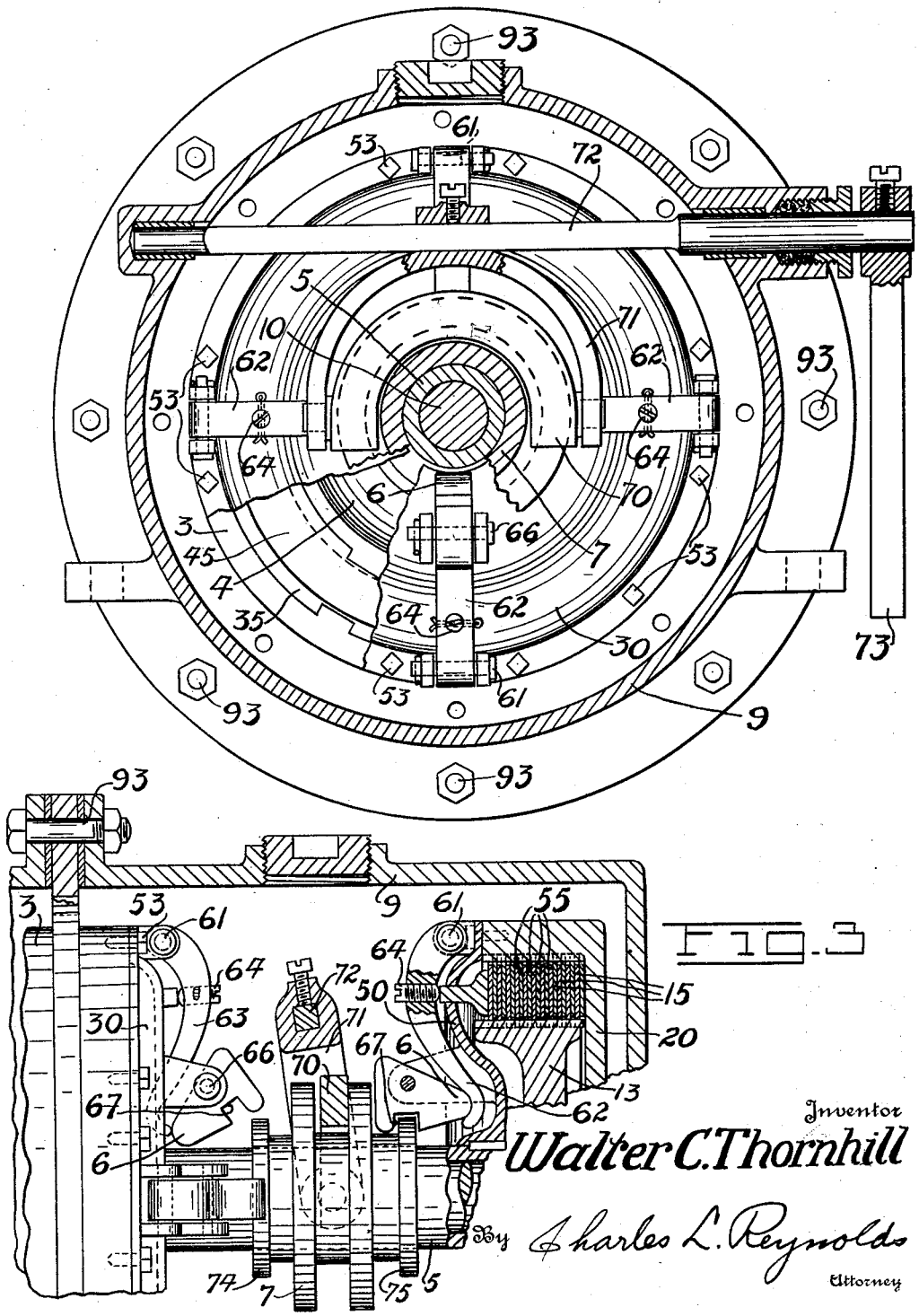

Patented Dec. 1, 1931

1,834,322

UNITED STATES PATENT OFFICE

WALTER C. THORNHILL, OF SEATTLE, WASHINGTON, ASSIGNOR OF ONE-HALF TO JOHN M. FERGUSON, OF SEATTLE, WASHINGTON

MARINE REVERSE GEAR

Application filed December 19, 1930. Serial No. 503,477.

My invention relates to an improvement in transmission mechanism, more particularly one intended for alternative forward or reverse drives in marine work.

It is an object of my invention to provide a simplified form of mechanism for the purpose intended, usually called a marine reverse gear, and to enable the incorporation thereinto of standardized disc clutch devices.

It is an object to provide such a device having a direct forward drive and a reverse drive accomplished through the agency of planetary spur gears, without the employment of internal gears, and a design enabling the provision of a reverse of such speed, relative to the forward speed, as the designer may select, this being dependent upon selection of the proper sizes of two spur gears.

It is a further object, in such a mechanism, to provide one clutch element which is stationary, whereby its support, mounting and control may be simplified.

A further object is the provision of a clutch control mechanism for such a device, especially one involving two axially spaced clutching devices, with a common selective control member between them, wherein the one clutch may be locked in clutch-engaged position while the other is disengaged, yet running free without friction between the engaged clutch and the clutch control member, and whereby the clutch control member will positively disengage the one clutch before engaging the other and locking it in clutch-engaged position. More especially, as relates to this phase of my invention, it is an object to reduce to the minimum the friction between the clutch elements and the clutch control member.

Other objects, and more especially such as are concerned with the mechanical details of my invention, may be ascertained from a study of this specification, of the claims terminating the same, and of the accompanying drawings, wherein my invention is described, claimed and shown in an embodiment which is at present preferred by me, it being understood that other forms may be adopted within the scope of the claims.

My invention comprises the novel parts and the novel combination and arrangement thereof, as thus disclosed, claimed and shown.

Figure 1 is an axial section through my device, parts being in the neutral position.

Figure 2 is a section generally on the line 2—2 of Figure 1.

Figure 3 is a detail section, similar to Figure 1, showing parts in position corresponding to direct drive ahead.

While it is largely immaterial which of two shafts is the driving shaft and which is the driven shaft, for convenience the shaft 1 may be designated the driving shaft and the shaft 2 the driven shaft. As a matter of convenience, they are aligned, being journaled in a housing 9 at 91 and 92, respectively, and there may be employed in addition a thrust bearing, as indicated at 90. Also as a matter of convenience, the driving shaft 1 may be provided with an extension 10, which is received in a socket 21 in the end of the driven shaft 2.

About the driving shaft 1, or more properly, about its extension 10, is disposed an anchor ring 3, which is fixed in position, as for instance, by being secured at 93 to the fixed housing 9. Journaled within this anchor ring is a free ring 4, and formed as a part of this free ring is a spur gear 41. Journaled within this free ring 4 and upon the driving shaft extension 10 is a sleeve 5. This sleeve also has a gear upon it, indicated at 51, and I prefer that the two gears 41 and 51 be disposed adjacent one another. They are of different diameters, and as shown, the gear 41 has the greater diameter. Changing the relative diameter of these gears effects a change in the speed of the reverse relative to the forward speed. Thus a high speed reverse may be obtained, as is sometimes desirable, at the pleasure of the designer.

Meshing with the gears 41 and 51 are two connected pinions 42 and 52, and I prefer that these be arranged in pairs, as may be seen in Figure 1. These pairs of pinions are journaled upon stub shafts 11 supported in suitable fashion to revolve about the driving shaft 1, as for instance, by being supported upon a flange or disc 12, which is part of the driving shaft 1.

The sleeve 5 has a direct connection with the driven shaft 2, there being a flange 50 secured to one end of this sleeve, which flange is secured, as by the bolts 53, to a flange 20 which is secured upon the driven shaft 2. The flanges 50 and 20 are spaced from one another, and in this space is rotatable a flange 13, which is keyed upon the driving shaft extension 10.

Disposed in the casing formed between the flanges 50 and 20, and between the external periphery of the flange 13 and the internal periphery of the flange 20, are two series of clutch plates, 55 and 15 respectively, the plates 55 being supported to rotate with the flanges 20 and 50, and the plates 15 to rotate with the flange 13. A presser ring 60 is moved inwardly, by means which will be described hereafter, to force the plates 55 and 15 into clutching engagement at such times as it is desired to clutch directly together the driving shaft 1 and the driven shaft 2, and thus to effect direct forward drive.

For reverse drive, the plates 55 and 15 are disengaged, and instead there are forced into clutching engagement two series of clutch discs 35 and 45, the series 35 being operatively connected to the anchor ring 3 and the series 45 being operatively connected to rotate with the free ring 4. When the presser ring 60 is pressed inwardly to force these plates 35 and 45 into clutching engagement, the effect is to stop rotation of the free ring 4 relative to the anchor ring 3, and when this occurs, the pinion 42 commences to roll about the now fixed gear 41. Since the pinions 42 and 52 are connected for equal rotation, the pinion 52 rotates at the same rate as the pinion 42, and since it is larger in diameter, its peripheral rate of rotation is greater, and this is transmitted to the gear 51, with the result that the sleeve 5 is caused to rotate in a direction opposite to that in which the driving shaft 1 is rotating, since the sleeve 5 is directly connected through the flanges 50 and 20 to the driving shaft. This effects reverse drive of the driven shaft.

As a means of controlling the engagement of the respective clutches, I have provided a clutch control collar 7, which is slidable lengthwise of the sleeve 5, under the control of a yoke 70, fork 71 upon a transverse rock shaft 72, and a shifting lever 73, outside of the housing 9. The collar 7 is provided at its ends with identical flanges which, to distinguish them, may be numbered 74 and 75 respectively.

Pivoted at 61, either upon the anchor ring 3 or upon the flange 20, are clutch presser levers 62, having at their free end a recess 63, and at an intermediate point an adjustable set screw 64, which may engage a projecting pin 65 connected to the corresponding presser ring 60. Thus, by pressing upon the end of the lever 62, the presser ring 60 is pressed inward, that is, in a direction to cause engagement of the clutch plates associated therewith.

Pivoted at 66, either upon the flange 50 or upon a flange 30 of the anchor ring 3, and adjacent the swinging end of the levers 62, is a dog 6 associated with each of the levers 62. The tip of this dog is adapted to engage within the recess 63 mentioned heretofore, and its inner side is provided with a notch 67, which is adapted to straddle the corresponding one of the flanges 74 or 75 upon the collar 7. The notch 67 is made somewhat larger than the collar flange, so that there need be no frictional contact between the notch and the flange.

Upon moving the collar 7 from the neutral position shown in Figure 1 to the right, into the position shown in Figure 3, the flange 75 engages within the notches 67 of the dogs at this side, and these dogs are moved to engage their tips within the recesses 63 of the corresponding presser levers. This action in effect locks the dogs and levers in clutch-engaged position, yet the flange 75 may run free in the notches 67, causing the minimum of friction by this arrangement. When it is desired to release the clutch, the collar 7 is shifted to the left, and it engages with the side of the notch 67, breaking the locking engagement of the dogs with the corresponding presser levers, and throwing the tip of the dogs out of their recesses 63. In this position, as may be seen in Figures 1 and 3, the flange may slide out of registry with the notch 67, and if moved far enough, will engage within the notches of the dogs of the other clutch, and will shift these dogs into clutch-engaged position; thus, either clutch may be locked in engaged position and maintained there with the minimum of friction between the parts.

If the clutch parts wear, or if adjustment is desirable, it may be had by adjustment of the set screws 64. The housing 9 may be filled with lubricant, which will find its way into the various bearings and wearing surfaces. The housing, of course, is non-rotative, and the number of rotating parts is kept at a minimum.

What I claim as my invention is:

1. In combination with a driving and a driven shaft, forward drive mechanism terminating in a clutch at one end of the driving shaft, reverse mechanism terminating in a clutch spaced therefrom along the shaft, a clutch collar slidable along the shaft and having a flange at each end, clutch presser levers associated with each clutch to engage the same when depressed, a clutch dog associated with each lever and having a notch adapted to receive and straddle the flange at its end of the clutch collar, thereby to swing the dog, means inter-engageable between the dog and its lever to maintain the lever in clutch-engaged position until the dog is withdrawn by axial movement of the collar, and means for shifting the collar axially.

2. In combination with a driving and a driven shaft, forward drive mechanism terminating in a clutch at one end of the driving shaft, reverse mechanism terminating in a clutch spaced therefrom along the shaft, a clutch collar slidable along the shaft and having a flange at each end, clutch presser levers associated with each clutch to engage the same when depressed, a clutch dog associated with each lever and having a notch adapted to receive and straddle the flange at its end of the clutch collar, thereby to swing the dog, the tip of the lever having a recess within which the tip of the dog is engageable when parts are in clutch-engaged position, and means for shifting the collar axially to disengage the dog from its recess, and itself to disengage the dog.

3. In combination with a driving shaft and a driven shaft aligned therewith, a fixed anchor ring surrounding the driving shaft, a geared sleeve journaled upon the driving shaft and directly connected to the driven shaft, a free ring journaled about the sleeve within the anchor ring and having its periphery spaced from the periphery of the anchor ring to form a reverse clutch casing, a gear upon the free ring of greater diameter than that upon the sleeve and disposed adjacent thereto, a pair of pinions connected for equal rotation, each meshing with one of said gears, a stub shaft supported from and revolving about the driving shaft, the pinions being journaled thereon, a flange upon the sleeve, a complemental flange upon the driven shaft spaced therefrom to form a forward clutch casing, a flange upon the driving shaft entering such casing, cooperating series of casing clutch discs disposed in the clutch casing, one series being operatively connected to the flange upon the driving shaft and the other series being operatively connected to the flange upon the driven shaft, two like series of clutch discs in the reverse clutch casing, one series being operatively connected to the free ring, and the other series to the anchor ring, means to press either set of said discs into clutching engagement, thereby clutching together the anchor ring and the free ring to effect, through the pinions, reverse rotation of the sleeve and driven shaft, or clutching together the two flanges to effect forward rotation of the sleeve and driving shaft.

Signed at Seattle, Washington this 8th day of December, 1930.

WALTER C. THORNHILL.